United States Patent [19]

Schoberth

[11] Patent Number: 4,550,023

[45] Date of Patent: Oct. 29, 1985

[54] METHOD AND FLOUR FOR PRODUCING SLICEABLE BREAD WITH A HIGH BRAN CONTENT

[76] Inventor: Hans Schoberth, Haus No. 9, D-8581 Harsdorf, Fed. Rep. of Germany

[21] Appl. No.: 643,460

[22] Filed: Aug. 23, 1984

Related U.S. Application Data

[63] Continuation of Ser. No. 404,911, Aug. 3, 1982, abandoned.

[30] Foreign Application Priority Data

Aug. 7, 1981 [DE] Fed. Rep. of Germany ....... 3131432

[51] Int. Cl.[4] ............................................. A21D 10/00
[52] U.S. Cl. ..................................... 426/19; 426/555; 426/622
[58] Field of Search ................. 426/19, 549, 622, 804, 426/555

[56] References Cited

U.S. PATENT DOCUMENTS

| 224,998 | 3/1880 | Dart | 426/622 |
|---|---|---|---|
| 1,271,139 | 7/1918 | Dickenson | 426/622 |
| 3,979,523 | 9/1976 | Titcomb et al. | 426/19 |
| 4,109,018 | 8/1978 | Thompson | 426/62 |
| 4,287,215 | 1/1981 | Joulin | 426/622 |
| 4,327,116 | 4/1982 | Weith | 426/19 |

*Primary Examiner*—Raymond Jones
*Assistant Examiner*—Elizabeth A. King
*Attorney, Agent, or Firm*—Spencer & Frank

[57] ABSTRACT

Disclosed is a bread flour comprising bread cereal flour, cereal bran and self-rising starch flour and method for making a leavened bread by preparing a dough having bread cereal flour, water, leavening agents, soy bran and self-rising starch flour which is subjected to baking, the said soy bran being in an amount equal to 10 to 30% by weight of the bread cereal flour and the said self-rising starch flour being in an amount equal to 2 to 8% by weight of bread cereal flour.

11 Claims, No Drawings

METHOD AND FLOUR FOR PRODUCING SLICEABLE BREAD WITH A HIGH BRAN CONTENT

This is a continuation of application Ser. No. 404,911 filed Aug. 3, 1982, now abandoned.

BACKGROUND OF THE INVENTION

The present invention relates to a method for producing sliceable bread having an increased roughage content wherein a bread dough is made from bread cereal flour. The invention further relates to a storable ready-mixed flour mixture suitable for implementing the method of making bread according to the invention.

It is known that the roughage content in human foods is generally too low. The term roughage is here understood to mean all organic components in foodstuffs which are not attacked by the digestive juices of the human body. Generally, these are vegetable foodstuffs essentially consisting of cellulose, hemicellulose, pectin and/or lignin. The effect of such roughage in food is complex and its presence will result, for example, in the stimulation of the digestive tract into peristalsis and also in loosening the food mixture to be digested so that the digestive juices have easier access to the food to be digested and thus accelerate the diffusion processes.

There have been many attempts to increase the roughage content of human foodstuffs including attempts to increase the roughage content in baked goods. For example, German Offenlegungsschrift No. 2,854,728 discloses a method for producing baked goods made essentially of bran where 2.5 to 15 parts by weight of a vegetable thickener, specifically carob bean meal, are added to the bran-water mixture to form a cookie. This German Offenlegungsschrift, however, is concerned with the production of a snack type product and there is no teaching of increasing the roughage content in sliceable bread.

German Offenlegungsschrift No. 2,933,521 discloses a method for producing a bran product in baked form, characterized by the fact that the recipe contains cold-swellable lubricating substances such as tragacanth, alginates, agar-agar, carob bean meal, cellulose derivatives, cold-swelling starch and its derivatives. The purpose of these lubricating substances is to coat the bran and thus make it more palatable and specifically to take away its rough, shell-like, chaffy taste. The product produced, however, is not bread, and there is no disclosure relating to increasing the roughage content in sliceable bread.

British Pat. No. 1,507,867 discloses an edible bran product whose content of phytic acid has been brought into a water insoluble form by binding it to calcium, magnesium, zinc or iron ions. The product is essentially a pharmaceutical diet product and can be produced in powder, cake or bread form with calcium phosphate or calcium sulfate being used, in particular, as the phytic acid binder. There is no disclosure relating to making a sliceable bread from bread cereal flour having increased roughage content.

There have been prior art attempts which have been directed specifically to increasing the roughage content in bread, but they have not been successful in substantially increasing the bread roughage content. For example, it has been proposed in the periodical "Getreide, Mehl und Brot," Sept. 1980, pages 243–247, to enrich breads and small baked goods with roughage, specifically, by the addition of edible bran. Such additives, however, are limited to about 10 percent by weight, occasionally up to 15 percent by weight, since larger amounts worsen the sliceability of the bread as well as other properties, such as, for example, crumb elasticity.

The publication "Die Mühle+Mischfuttertechnik", in translation, The Mill and Feed Mixing Art, Volume 118, Jan. 22, 1981, No. 4, pages 47–50, discloses the production of small baked goods containing a "minimum" of 10% edible bran. Specifically, the publication describes whole grain rye bread containing 10% edible bran and small baked goods containing 10 to 15% edible bran including yeast-raised cakes enriched with roughage material up to 20%. The breads described are experimental in nature, however, and the publication generally indicates that, from a practical standpoint, the additions of edible bran are limited to 10% in recipes for breakfast cereals, bread, small baked goods and fine baked goods and that additions of edible bran exceeding 10% would be difficult.

For some time, the use of ready-mixed flours which contain roughage has been recommended for the manufacture of bread enriched with roughage. This has the advantage that deviations from the recipe become impossible and the baker need not purchase suitable roughage materials, such as hygienically acceptable edible brans.

In general, however, prior art attempts to produce a sliceable bread from bread cereal flour with a roughage content in excess of 10 or 15% have not been successful because of failure of the roughage material to properly bind to the bread.

The binding of the above-mentioned roughage material, for example edible bran, in a bread dough is more difficult the greater the amount of roughage material. It has been observed that it is possible to bind relatively small amounts of roughage material during the proofing process and particularly during the baking process. If the content of roughage material exceeds the limit of 10 or 15%, however, depending on the type and physical consistency of the roughage material, the binding is not sufficient and the resulting bread does not slice well, has low crumb stability, tastes dry and strawy, and cannot be covered with a spread in the desired manner.

SUMMARY OF THE INVENTION

It is an object of the present invention to improve the known methods for producing high roughage bread with the aim of better binding roughage in the order of magnitude of 10 to 15 percent.

Another object of the present invention is to provide a method for producing high roughage bread which can bind higher amounts of roughage in the bread.

It is a further object of the invention to provide a storable ready-mixed flour mixture which is suitable for implementation of the method according to the invention.

In order to achieve these objects, and in accordance with its purpose, the present invention provides a method for making bread comprising the steps of: making a dough containing bread cereal flour, water, vegetable roughage material in an amount equal to 10 to 30% by weight of the dough, on a dry basis, and self-rising flour in an amount equal to 2 to 8% by weight of the dough, on a dry basis; and baking the dough to form bread.

In another aspect of the present invention, a bread flour is provided which comprises bread cereal flour, 10 to 30% by weight vegetable roughage material, and 2 to 8% by weight self-rising flour.

It is to be understood that both the foregoing general description, and the following detailed description are exemplary, but are not restrictive of the invention.

DETAILED DESCRIPTION OF THE PREFERRED EMBODIMENTS

It has been discovered that it is possible to improve the binding of roughage material and also bind significantly higher quantities of roughage material if, in addition to the roughage material, small quantities of self-rising flour are present in the dough which is used to prepare bread. Specifically, it has been found that by forming a dough containing self-rising flour in an amount of 2 to 8 percent by weight of the dough, on a dry basis, vegetable roughage materials in amounts from 10 up to 30 percent by weight of the dough, on a dry basis, can be incorporated in the dough which can then be used to form a bread in which the roughage material is reliably bound. In a preferred embodiment of the invention, the self-rising flour is present in the dough in an amount of 4 to 5 percent by weight, and the vegetable roughage material is present in the dough in an amount of 20 to 25 percent.

The dough employed in the present invention thus contains bread cereal flour, self-rising flour, roughage material and water. The dough can further contain one or more additives conventionally used to prepare bread, such as acidifying agents, salt, and other seasonings. Moreover, leavening agents such as yeast can be added to the dough.

The bread cereal flour used to prepare the dough can be one or more conventional bread cereal flours, such as wheat flour, rye flour, and the like.

The self-rising flours employed in the present invention are known per se, and are produced from cereals and/or potatoes, for example rolled potato flour, and contain about 70% starch gluten on a dry basis. They are manufactured by heating the flour and water to form a starch paste, then drying the resulting paste on rollers, and then grinding the dried starch paste. Flours pretreated in this manner have the characteristic that when remoistened with water, they quickly rise even at room temperature and develop binding properties.

The dough of the present invention can be prepared by a number of techniques. In one embodiment of the present invention, the dough is prepared by adding the self-rising flour to a dry starting flour comprised of the bread cereal flour and then adding water. The starting flour can contain one or more additives conventionally employed to make bread such as acidifying agents (organic edible feed acids), salt, (table salt: NaCl), seasonings, and leavening agents such as yeast. The roughage material can be added to the dry starting flour before the water is added, or can be added to the mixture of starting flour, self-rising flour and water.

In another embodiment of the present invention, the dough of the present invention is prepared by forming a mixture of water and the starting flour comprised of the bread cereal flour, which mixture is referred to herein as a pre-dough. Then the self-rising flour, or the vegetable roughage material, or both the self-rising flour and vegetable roughage material are added to the pre-dough. In the case where only self-rising flour is added to the pre-dough, the roughage material and bread cereal flour are mixed together first, water is added to form the pre-dough, and then the self-rising flour is added. Similarly, in the case where only roughage material is added to the pre-dough, the self-rising flour and bread cereal flour are mixed together first, water is added to form the pre-dough, and then the roughage material is added.

Thus, it has been found that the addition of self-rising flour in an amount equal to 2 to 8 percent by weight of the dough, on a dry basis, to the starting flour and/or to a pre-dough formed by the starting flour and water permits reliable binding of vegetable roughage materials in quantities up to 30 percent by weight of the dough, on a dry basis, whether the vegetable roughage materials are added to the starting flour and/or to the pre-dough. In addition, not only does the addition of self-rising flour result in better binding of the vegetable roughage material into the bread, but crumb stability as well as taste are improved. In all cases, vegetable roughage material and the self-rising flour are included such that the dough comprises bread cereal flour, water, vegetable roughage material in an amount equal to 10 to 30 percent of the dough, on a dry basis, and self-rising flour in an amount equal to 2 to 8 percent of the dough, on a dry basis. The conventional bread additives which can be present in the dough can be added to the starting flour or can be added with the water.

It is possible to use the above-described method to produce sliceable bread having an increased roughage content in the conventional manner, i.e. by assembling the recipe from its individual components. It is more advantageous, however, to use ready-mixed flour mixtures. Thus, in a preferred embodiment according to the invention, a dry ready-mixed flour mixture is provided which contains vegetable roughage material in an amount equal to 10 to 30 percent by weight of the flour mixture, self-rising flour in an amount equal to 2 to 8 percent by weight of the flour mixture and the remainder bread cereal flour which also can contain one or more of the usual additives of salt, leavening and/or acidifiers and possibly seasonings.

In the practice of the present invention, the roughage content in the bread is somewhat less than the roughage content in the ready-mixed flour or dough because some water evaporates during the baking process. For example, with a bran content of 30% by weight in the ready-mixed flour mixture, the roughage content of the bread can be 25% by weight, yet the bread has good sliceability and crum stability without a strawy taste.

A particularly preferred composition for a ready-mixed flour mixture has been found to be a mixture including 20 to 25 percent by weight edible bran and 4 to 5 percent by weight self-rising flour. "Edible bran" is here understood to mean the known cereal brans, such as wheat bran, possibly rye bran or oat bran, as well as soy bran, bean shells or the like.

The following recipe for ready-mixed flour according to the invention is given by way of illustration to further explain the principles of the invention. This example is merely illustrative and is not to be understood as limiting the scope and underlying principles of the invention in any way:

12 percent by weight wheat bran
12 percent by weight soy bran
3 percent by weight self-rising flour
35 percent by weight wheat flour
35 percent by weight rye flour
2 percent by weight table salt
1 percent by weight organic food acid, for example lactic acid, tartaric acid, citric acid or the like.

The method of the present invention can be implemented and the ready-mixed flour mixture can be processed as follows:

100 parts by weight of the ready-mixed flour in accordance with the present invention, preferably, the ready-mixed flour of the above recipe, are kneaded with 80 parts by weight water into a dough to which yeast is added in amounts about equal to 2.5 to 3 parts by weight of the ready-mixed flour. The water temperature is selected so that the finished dough has a temperature of 25° to 29° C.

After thorough kneading, the dough is permitted to rest for 30 to 40 minutes. Then the dough is processed in the usual manner, i.e. shaped into loaves. Advisably, the pieces of dough are let to proof in baking boxes at a temperature of about 30° C.

At the end of proofing, the bread is baked at 280° C. with decreasing temperature by pushing the loaves into an oven that has been preheated to 280° C. and after about 10 minutes of baking, reducing the oven temperature slowly.

After cooling, the fully baked bread is easily sliceable and the slices have normal bread consistency and can be covered with suitable spreads without difficulty.

It will be understood that the above description of the present invention is susceptible to various modifications, changes and adaptations and the same are intended to be comprehended within the meaning and range of equivalents of the appended claims.

What is claimed is:

1. A method of making leavened sliceable loaf bread from a dry flour having from 10 to 30% by weight soy bran, wherein said bread is easily sliced and can be covered with suitable spreads without difficulty, and wherein said bread has good crumb stability and is without a strawy taste comprising the steps of
    (a) making a dough by mixing together the ingredients comprising bread cerealflour; water; leavening agents; soy bran in an amount equal to 10 to 30% by weight of the dough on a dry basis; and self-rising starch flour prepared from cereal or potato flour by heating said flour with water to form a starch paste, drying said paste, and grinding said dried paste, in an amount equal to 2 to 8% by weight of the dough on a dry basis;
    (b) baking the dough to form bread.

2. The method of making bread of claim 1, wherein the step of making the dough comprises forming a mixture of the soy bran material, the self-rising flour and the bread cereal flour, and then adding the water to the mixture.

3. The method of claim 1, wherein the step of making the dough comprises the steps of making a pre-dough comprising the bread cereal flour, the self-rising flour and the water, and then adding the soy bran material to the pre-dough.

4. The method of claim 1, wherein the step of making the dough comprises the steps of making a pre-dough comprising the bread ceral flour, the soy bran material and the water, and then adding the self-rising flour to the pre-dough.

5. The method of claim 1, wherein the step of making the dough comprises the steps of making a pre-dough comprising the bread cereal flour and water, and then adding the soy bran material and self-rising flour to the pre-dough.

6. The method of claim 1, wherein the bread dough contains soy bran material in an amount equal to 20 to 25% by weight of the dough, on a dry basis, and self-rising flour in an amount equal to 4 to 5 percent by weight of the dough, on a dry basis.

7. The method of claim 1, wherein the dough contains at least one additive selected from acidifying agents, salt, and seasonings.

8. A bread flour for leavened sliceable loaf bread which is easily sliced and can be covered with suitable spreads without difficulty, and has good crumb stability and is without a strawy taste, comprising
    (a) bread cereal flour,
    (b) 10 to 30% by weight cereal bran, and
    (c) 2 to 8% by weight self-rising starch flour prepared from cereal or potato flour by heating said flour with water to form a starch paste, drying said paste, and grinding said dried paste.

9. The bread flour of claim 8, wherein said cereal bran comprises edible bran present in an amount equal to 20 to 25 percent by weight, and wherein said self-rising flour is present in an amount equal to 4 to 5 percent by weight.

10. The bread flour according to claim 8 comprising:
    (a) 12 percent by weight wheat bran,
    (b) 12 percent by weight soy bran,
    (c) 3 percent by weight self-rising flour,
    (d) 35 percent by weight wheat flour,
    (e) 35 percent by weight rye flour,
    (f) 2 percent by weight table salt, and
    (g) 1 percent by weight organic edible acid.

11. The bread flour according to claim 8, and further containing at least one additive selected from acidifying agents, salt, leavening agents and seasonings.

* * * * *